United States Patent
Fukuda et al.

(10) Patent No.: US 9,423,241 B2
(45) Date of Patent: Aug. 23, 2016

(54) OPTICAL MEASURING APPARATUS

(71) Applicant: MITUTOYO CORPORATION, Kanagawa (JP)

(72) Inventors: Shinji Fukuda, Kanagawa (JP); Ryoichi Imaizumi, Kanagawa (JP)

(73) Assignee: MITUTOYO CORPORATION, Kanagawa (JP)

( * ) Notice: Subject to any disclaimer, the term of this patent is extended or adjusted under 35 U.S.C. 154(b) by 0 days.

(21) Appl. No.: 14/277,351

(22) Filed: May 14, 2014

(65) Prior Publication Data

US 2014/0340694 A1    Nov. 20, 2014

(30) Foreign Application Priority Data

May 20, 2013 (JP) ................. 2013-105906

(51) Int. Cl.
*G01B 11/08* (2006.01)
*G01B 11/24* (2006.01)

(52) U.S. Cl.
CPC ............ *G01B 11/08* (2013.01); *G01B 11/2433* (2013.01)

(58) Field of Classification Search
USPC .................................................. 356/625–636
See application file for complete search history.

(56) References Cited

U.S. PATENT DOCUMENTS

| | | | | |
|---|---|---|---|---|
| 4,007,992 A * | 2/1977 | Petrohilos | ............ | G01B 11/105 250/559.24 |
| 4,129,384 A * | 12/1978 | Walker | ............ | G01B 11/16 356/640 |
| 4,416,541 A * | 11/1983 | Studer | ............ | B29C 47/92 250/559.24 |
| 4,417,147 A * | 11/1983 | Faville | ............ | G01B 11/26 250/559.14 |
| 4,938,599 A * | 7/1990 | Goszyk | ............ | G01B 11/08 250/559.07 |
| 5,113,591 A * | 5/1992 | Connelly | ............ | G01B 11/2408 33/550 |
| 5,659,389 A * | 8/1997 | Hieb | ............ | G01D 5/342 250/231.13 |
| 7,355,143 B1 * | 4/2008 | Nakano | ............ | G01N 15/0211 118/723 R |
| 2002/0041381 A1* | 4/2002 | Akishiba | ............ | G01B 11/2433 356/638 |
| 2006/0017940 A1* | 1/2006 | Takayama | ............ | G01B 11/2433 356/640 |
| 2010/0259769 A1* | 10/2010 | Kataoka | ............ | G01B 21/045 356/625 |

FOREIGN PATENT DOCUMENTS

JP   2010-249604   11/2010
JP   2011-106817   6/2011

* cited by examiner

*Primary Examiner* — Sang Nguyen
(74) *Attorney, Agent, or Firm* — Greenblum & Bernstein, P.L.C.

(57) ABSTRACT

An optical measuring apparatus includes a light emitter, a scanner, a polarizing plate, a photoreceiver, and a CPU. The light emitter emits a laser beam. The scanner uses the laser beam emitted from the light emitter and scans a measurement region where a work piece is placed. The polarizing plate allows passage for only a laser beam, among the laser beams fired by the scanner, directed orthogonally to an emission direction of the laser beam and an axis direction of the work piece. The photoreceiver receives the laser beam that has passed through the measurement region and the polarizing plate. The CPU calculates a dimension of the work piece from a pattern of light and dark in a scan direction, the pattern being obtained by the photoreceiver.

6 Claims, 8 Drawing Sheets

OPTICAL MEASURING APPARATUS

CROSS-REFERENCE TO RELATED APPLICATIONS

The present application claims priority under 35 U.S.C. §119 of Japanese Application No. 2013-105906, filed on May 20, 2013, the disclosure of which is expressly incorporated by reference herein in its entirety.

BACKGROUND OF THE INVENTION

1. Field of the Invention

The present invention relates to an optical measuring apparatus.

2. Description of Related Art

Conventionally, a scanning optical measuring apparatus is known in which laser beams bombard a measured object (work piece) by scanning in parallel, then a dimension of the work piece is measured from a pattern of light and dark (scan signal) in a scan direction, which is detected from behind the work piece. As an example of the above-noted optical measuring apparatus, a device is known which is capable of correcting misalignment in a direction orthogonal to the scan direction (see, e.g., Japanese Patent Laid-open Publication No. 2010-249604). In addition, a device is known which is capable of recognizing a valid measurement range and of achieving highly accurate measurement (see, e.g., Japanese Patent Laid-open Publication No. 2011-106817).

However, the technologies disclosed by Japanese Patent Laid-open Publication Nos. 2010-249604 and 2011-106817 are not capable of eliminating an adverse influence of outside light (skip light) reflecting off the work piece. In particular, as shown in FIG. 8, in a case where a surface of a work piece W is nearly a mirror surface, as in a pin gage, a portion of a laser beam 101, which is normally expected to be blocked by the work piece W, may reflect off a surface of the work piece W to become skip light L102 and strike a photoreceiver element 132. In a case where the skip light L102 strikes the photoreceiver element 132, an amount of time that the work piece W blocks the laser beam L101 is shorter in comparison to a case where the skip light L102 does not strike the photoreceiver element 132. The conventional optical measuring apparatus measures a dimension based on an amount of time that the laser beam L101 is blocked. Therefore, when the amount of time is shorter, a dimension is measured that is correspondingly smaller than an actual dimension of the work piece W.

The present invention provides an optical measuring apparatus capable of accurately measuring a dimension of a measured object.

SUMMARY OF THE INVENTION

One aspect of the present invention is an optical measuring apparatus conceived in order to resolve the above circumstances, and includes a light emitter, a scanner, a polarizing plate, a photoreceiver, and a dimension calculator. The light emitter emits a laser beam. The scanner uses the laser beam emitted from the light emitter and scans a measurement region where a measured object is placed. The polarizing plate allows passage for only a laser beam, among the laser beams fired by the scanner, directed orthogonally to an emission direction of the laser beam and an axis direction of the measured object. The photoreceiver receives the laser beam that has passed through the measurement region and the polarizing plate. The dimension calculator calculates a dimension of the measured object from a pattern of light and dark in a scan direction, the pattern being obtained by the photoreceiver.

In another aspect of the present invention, the polarizing plate is placed between the scanner and the measured object.

In another aspect of the present invention, the polarizing plate is placed between the measured object and the photoreceiver.

In another aspect of the present invention, the polarizing plate is detachable.

According to the present invention, an amount of incident skip light received by a photoreceiver element can be reduced by a polarizing plate, and thus a dimension of a measured object can be accurately measured.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the forms of the present invention may be embodied in practice.

An embodiment of the present invention is described below with reference to the drawings.

The embodiment of the present invention is described in detail below with reference to the drawings. In the following description, an emission direction (scan direction) of light is designated as a Z direction, an axis direction of a work piece is designated as an X direction, and a direction orthogonal to the Z direction and the X direction is designated as a Y direction.

An optical measuring apparatus 100 according to the present embodiment is a laser scanning micrometer (LSM) measuring a dimension of a work piece by performing a one-dimensional scan with a laser beam. The optical measuring apparatus 100 is used, for example, in dimension measurement of electronic or machine components, and in measuring an outer diameter of a round metal bar or optical fiber.

Figure 1:
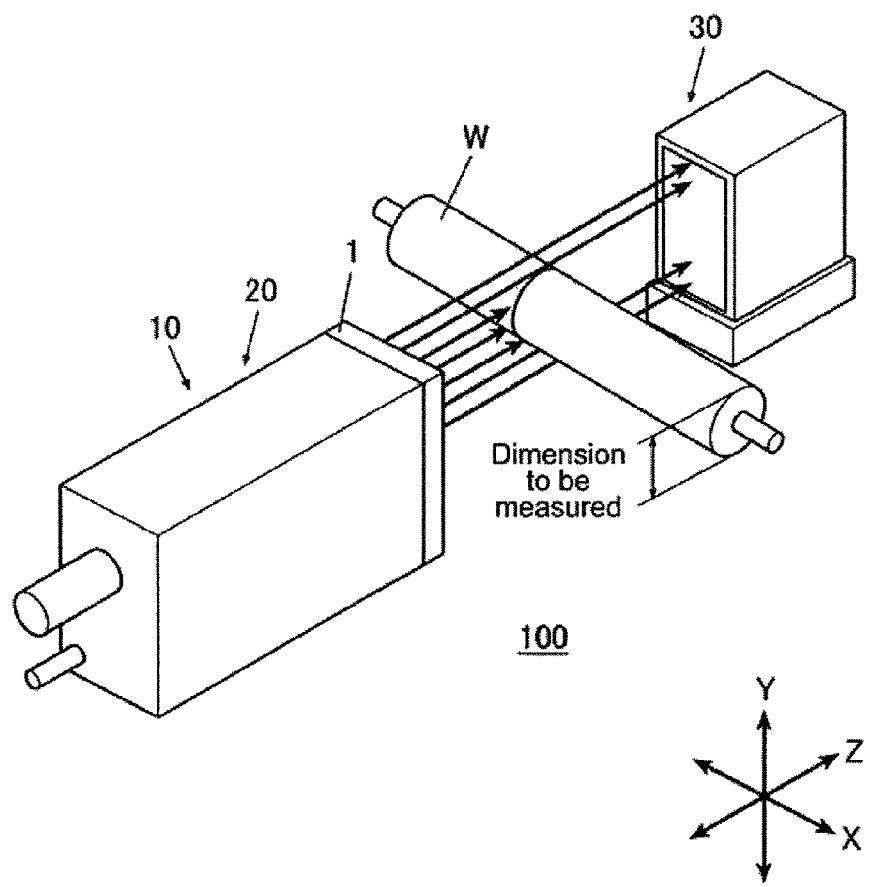
FIG. 1 is a perspective view illustrating an overall configuration of an optical measuring apparatus according to an embodiment of the present invention.
Figure 2:
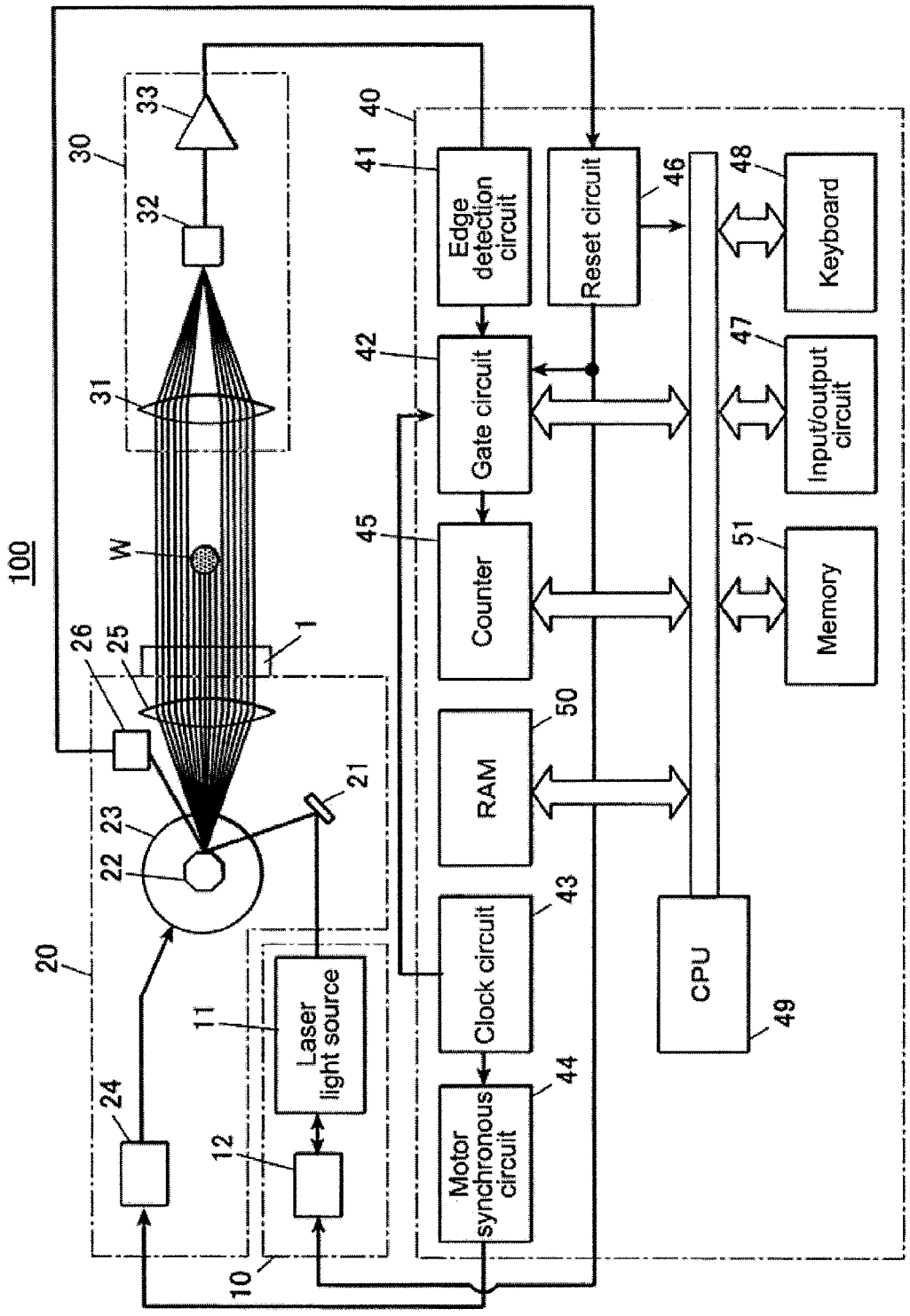
FIG. 2 is a block diagram illustrating a control configuration of the optical measuring apparatus according to the embodiment.

As shown in FIGS. 1 and 2, the optical measuring apparatus 100 includes a light emitter 10, a scanner 20, a linear polarizing plate 1, a photoreceiver 30, and a calculator 40. The light emitter 10 emits a laser beam. The scanner 20 fires a scanning beam at a measurement region in which a cylindrical work piece W has been placed. The linear polarizing plate 1 allows passage for only a scanning beam, among the scanning beams fired by the scanner 20, directed orthogonally to an emission direction of the laser beam and an axis direction of the work piece W. The photoreceiver 30 receives the scanning beam that has passed through the measurement region and the linear polarizing plate 1, and transmits a corresponding photoreception signal. The calculator 40 measures the dimension of the work piece W based on the photoreception signal.

The light emitter 10 includes, for example, a laser light source 11 and a laser emission adjustment circuit 12. The light emitter 10 acts as a light emitter according to the present invention.

The laser light source 11 is configured by a semiconductor laser element, for example, and fires a beam of light (laser beam) having a wavelength of 650 nm, for example, and substantially a circular or elliptical shape in cross-section. The laser light source 11 is controlled by the laser emission adjustment circuit 12 and is turned on and off at high speed (e.g., several MHz to several tens of MHz).

The scanner 20 includes, for example, a reflecting mirror 21, a polygonal mirror 22, a motor 23, a motor drive circuit 24, an F-θ lens 25, and a synchronous photoreceiver element 26. The scanner 20 acts as a scanner according to the present invention, using the laser beam emitted from the light emitter 10 to scan the measurement region where the work piece W is placed.

The reflecting mirror 21 reflects the beam of light fired from the laser light source 11 so as to be incident on the polygonal mirror 22.

The polygonal mirror 22 is rotated by the motor 23, which is positioned so as to be coaxial with the polygonal mirror 22, and the incident beam of light from the reflecting mirror 21 is converted into a rotating scanning beam and strikes the F-θ lens 25. Specifically, the polygonal mirror 22 is a rotating multi-faceted mirror in which each lateral surface of a polygonal column (an octagonal column in FIG. 2) configures a reflecting surface. The polygonal mirror 22 is rotationally driven by the motor 23 at a speed of, for example, 5000 to 20,000 revolutions per minute. Due to this rotation, the polygonal mirror 22 modifies a reflection angle of the beam of light striking the reflecting surface, thus causing the beam of light to perform deflection scanning in a primary scan direction.

The motor drive circuit 24 supplies electric power to the motor 23 based on output from a motor synchronous circuit 44 (described hereafter).

The F-θ lens 25 converts the rotating scanning beams converted by the polygonal mirror 22 into parallel scanning beams having equal speeds. Specifically, by changing a curvature of two lens surfaces, the F-θ lens 25 is designed such that scanning speeds will be constant in a vicinity of the lens and at a center portion. Accordingly, the dimension of the outer diameter of an object can be found by using the F-θ lens 25 to measure a duration of a shadow portion blocked by the work piece W. The beam of light converted to the parallel scanning beam by the F-θ lens 25 is fired so as to scan the measurement region that includes the work piece W in conjunction with rotation of the polygonal mirror 22.

The synchronous photoreceiver element 26 is on an exterior of the F-θ lens 25 and is positioned so as to receive the laser beam before one scan cycle begins or after one scan cycle ends, the scan cycle occurring in a range where the laser beam passes through the F-θ lens 25. The synchronous photoreceiver element 26 detects the beginning or ending of one laser beam scan and outputs a timing reference signal (hereafter referred to as a reference signal) in the form of a pulse. Specifically, each time one laser beam scanning cycle begins or ends, the reference signal is output once.

The linear polarizing plate (polarizing plate) 1 is formed such that an orientation of polarized light is in a direction orthogonal to the emission direction of the laser beam (Z direction in the drawings) and the axis direction of the work piece W (X direction in the drawings), i.e., a perpendicular direction (Y direction in the drawings) with respect to the reflecting surface (XZ plane) of the work piece W. In other words, when the light converted into parallel scanning beams by the F-θ lens 25 passes through the linear polarizing plate 1, an oscillation component in a direction horizontal with respect to the reflecting surface of the work piece W (X direction in the drawings) is blocked and only light in a direction perpendicular with respect to the reflecting surface of the work piece W (Y direction in the drawings) passes therethrough.

The photoreceiver 30 includes, for example, a collecting lens 31, a photoreceiver element 32, and an amplifier 33. The photoreceiver 30 acts as a photoreceiver according to the present invention receiving the laser beam that has passed through the measurement region and the linear polarizing plate 1.

The collecting lens 31 condenses the parallel scanning beams passing through the work piece W and causes the beams to strike the photoreceiver element 32.

When the beam of light condensed by the collecting lens 31 strikes the photoreceiver element 32, the corresponding photoreception signal (pattern of light and dark) is output. Specifically, when receiving the laser beam, the photoreceiver element 32 emits the photoreception signal for H ("high," light portion), and when not receiving, the photoreceiver element 32 emits the photoreception signal for L ("low," dark portion). In other words, in a case where the laser beam is blocked by the work piece W and does not reach the photoreceiver element 32, the photoreceiver element 32 emits the L signal. Accordingly, once duration of the L signal is measured when the laser beam is scanning the measurement region, a scan-direction dimension of the work piece W within a scanned plane can be measured. Moreover, a process calculating these dimensions is performed by the calculator 40.

The amplifier 33 amplifies the photoreception signal transmitted by the photoreceiver element 32 and transmits the photoreception signal to the calculator 40.

The calculator 40 includes, for example, an edge detection circuit 41, a gate circuit 42, a clock circuit 43, the motor synchronous circuit 44, a counter 45, a reset circuit 46, an input/output circuit 47, a keyboard 48, a Central Processing Unit (CPU) 49, a Random Access Memory (RAM) 50, and a memory 51.

The photoreception signal transmitted from the amplifier 33 is input to the edge detection circuit 41. The edge detection circuit 41 binarizes the photoreception signal with a predetermined threshold value to convert the photoreception signal into an edge signal (binarized signal). Also, the edge detection circuit 41 detects an edge of a step-up where the photoreception signal changes from L to H and of a step-down where the photoreception signal changes from H to L, then transmits an edge detection signal to the gate circuit 42.

The edge detection signal transmitted from the edge detection circuit 41, a reset signal transmitted from the reset circuit 46, and a clock signal transmitted from the clock circuit 43 are input to the gate circuit 42. The gate circuit 42 turns on and off at a predetermined timing of the edge detection signal and the reset signal, and controls beginning and ending of a transmission of the clock signal to the counter 45. In other words, in a period where the gate circuit 42 is on, the clock signal is transmitted to the counter 45. Also, in a case where a dimension of the work piece W is measured, measurement of the clock signal is performed from a point when the first step-down edge is detected until a point when the last step-up edge is detected.

The clock circuit 43 transmits the clock signal to the gate circuit 42 and the motor synchronous circuit 44.

The motor synchronous circuit 44 outputs to the motor drive circuit 24 a drive signal synchronized to the clock signal input from the clock circuit 43. Moreover, the motor drive circuit 24 supplies electric power to the motor 23 based on the output from the motor synchronous circuit 44. Accordingly, the polygonal mirror 22 rotates at a speed having a predetermined relationship with the clock signal.

The reference signal output when the laser is detected by the synchronous photoreceiver element 26 is input to the reset circuit 46. When the reference signal is input, the reset circuit 46 transmits the reset signal to the gate circuit 42.

The input/output circuit 47 transmits a calculated value (dimension of the work piece W) and the like to an external output device (not shown in the drawings) such as a display device or a printing device.

The keyboard 48 includes a group of various operation keys. When a user performs press-down operation of a predetermined key on the keyboard 48, an operation signal corresponding to the press-down operation is output to the CPU 49.

The CPU 49 performs, for example, various control processes in accordance with various processing programs stored in the memory 51. The RAM 50 forms a work piece memory area storing data calculated and processed by the CPU 49. The memory 51 stores, for example, a system program capable of being executed by the CPU 49, various processing programs capable of being executed by the system program, data used when executing the various processing programs, and data for results of the various processes calculated and processed by the CPU 49. Moreover, the programs are stored in the memory 51 in a form of programming code capable of being read by a computer.

By measuring a period of time when the laser beam is scanning the measurement region and the photoreception signal transmitted from the photoreceiver element 32 is the L signal, the CPU 49 measures a scan-direction dimension of the work piece W within the scanned surface. The CPU 49 acts as a dimension calculator according to the present invention, calculating the dimension of the work piece W from the pattern of light and dark in the scan direction obtained by the photoreceiver 30.

Figure 3:
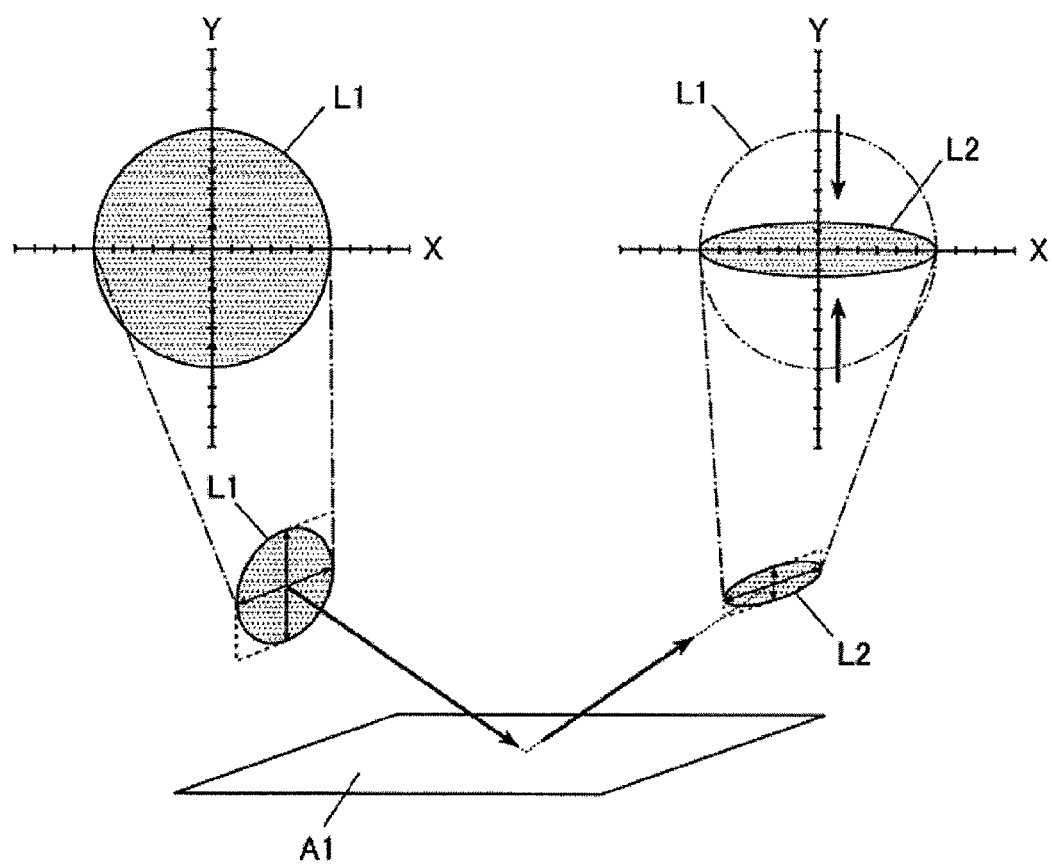
FIG. 3 is a frame view illustrating a change in a polarized state of light during reflection of the light.

Next, a description is given of effects of the optical measuring apparatus 100 according to the present embodiment. In general, as shown in FIG. 3, the oscillation component of light (incident light L1) in a direction perpendicular to a reflecting surface A1 of an object becomes attenuated during reflection off the object. Specifically, the oscillation component of a skip light L2 is shown to be primarily in a direction horizontal to the reflecting surface A1. Simultaneously, identification of the skip light L2 is shown to be possible. Even in the optical measuring apparatus 100, a primary component of the oscillation of the skip light L2 can be empirically confirmed to be horizontal with respect to the reflecting surface A1. Moreover, in the present embodiment, the reflecting surface of the work piece W is a surface (XZ plane) formed in the emission direction of the light (Z direction in the drawings) and the axis direction of the work piece W (X direction in the drawings).

Figure 4:
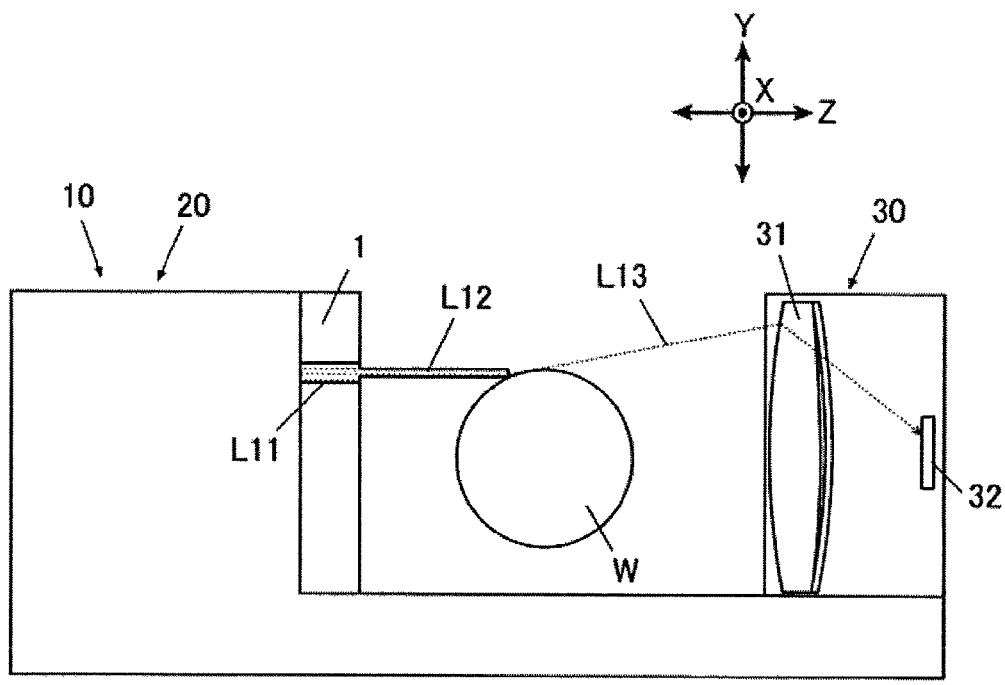
FIG. 4 is a frame view illustrating a change in the polarized state of light in the optical measuring apparatus according to the embodiment.
Figure 5A:
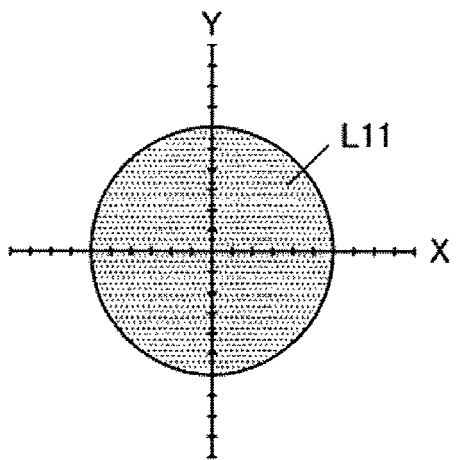
FIGS. 5A, 5B, and 5C are cross-sectional views illustrating the change in the polarized state of light shown in FIG. 4.
Figure 5B:
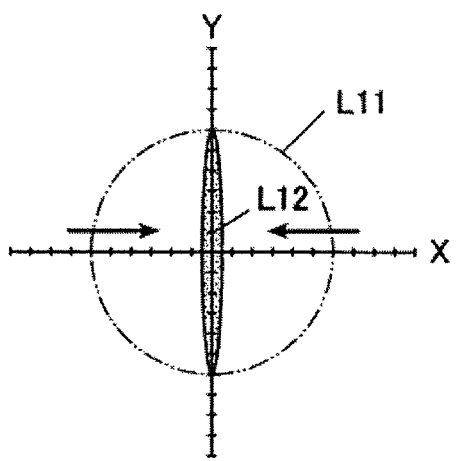
Figure 5C:
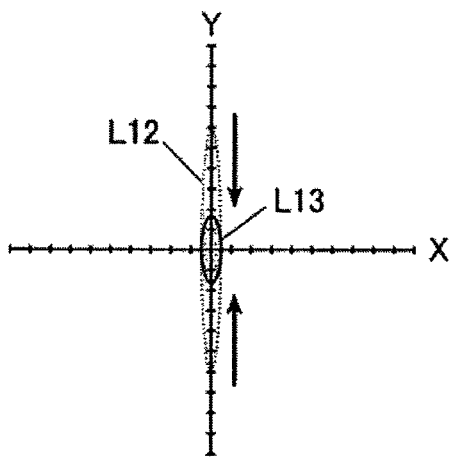

In the present embodiment, as shown in FIG. 4, the linear polarizing plate 1 is placed between the light emitter 10 (and the scanner 20) and the work piece W. The linear polarizing plate 1 is formed such that the orientation of the polarized light is in a direction orthogonal to the emission direction of the laser beam (Z direction in the drawings) and the axis direction of the work piece W (X direction in the drawings), i.e., a perpendicular direction (Y direction in the drawings) with respect to the reflecting surface (XZ plane) of the work piece W. Accordingly, when light L11 (see FIG. 5A) emitted from the light emitter 10 (and the scanner 20) passes through the linear polarizing plate 1, the horizontal-direction (X direction in the drawings) oscillation component is blocked with respect to the reflecting surface of the work piece W and only light L12 (see FIG. 5B) in a perpendicular direction with respect to the reflecting surface of the work piece W (Y direction in the drawings) passes therethrough. A portion of the light L12 transmitted through the linear polarizing plate 1 is reflected by the surface of the work piece W to become skip light L13 (see FIG. 5C). The oscillation component of the skip light L13 reflected by the surface of the work piece W becomes attenuated during reflection off the work piece W, the oscillation component being in a perpendicular direction (Y direction in the drawings) with respect to the reflecting surface of the work piece W. In other words, the oscillation components of the skip light L13 in both the horizontal direction (X direction in the drawings) and the perpendicular direction (Y direction in the drawings) with respect to the reflecting surface of the work piece W become attenuated. Accordingly, an amount of incident skip light L13 received by the photoreceiver element 32 is reduced.

As noted above, the optical measuring apparatus 100 according to the present embodiment includes the light emitter 10, the scanner 20, the linear polarizing plate 1, the photoreceiver 30, and the CPU 49. The light emitter 10 emits the laser beam. The scanner 20 uses the laser beam emitted from the light emitter 10 to scan the measurement region in which the work piece W has been placed. The linear polarizing plate 1 allows passage for only a laser beam, among the laser beams fired by the scanner 20, directed orthogonally to the emission direction of the laser beam and the axis direction of the work piece W. The photoreceiver 30 receives the laser beam that has passed through the measurement region and the linear polarizing plate 1. The CPU 49 calculates the dimension of the work piece W based on the pattern of light and dark in the scan direction, obtained by the photoreceiver 30. In addition, the linear polarizing plate 1 of the optical measuring apparatus 100 according to the present embodiment is placed between the scanner 20 and the work piece W. Accordingly, the amount of incident skip light received by the photoreceiver element 32 can be reduced by the linear polarizing plate 1, and thus the dimension of the work piece W can be accurately measured.

In the above, a concrete description was given based on an embodiment according to the present invention. However, the present invention is not limited to the above-described embodiment and can be modified without deviating from the scope of the invention.

First Modification

Figure 6:
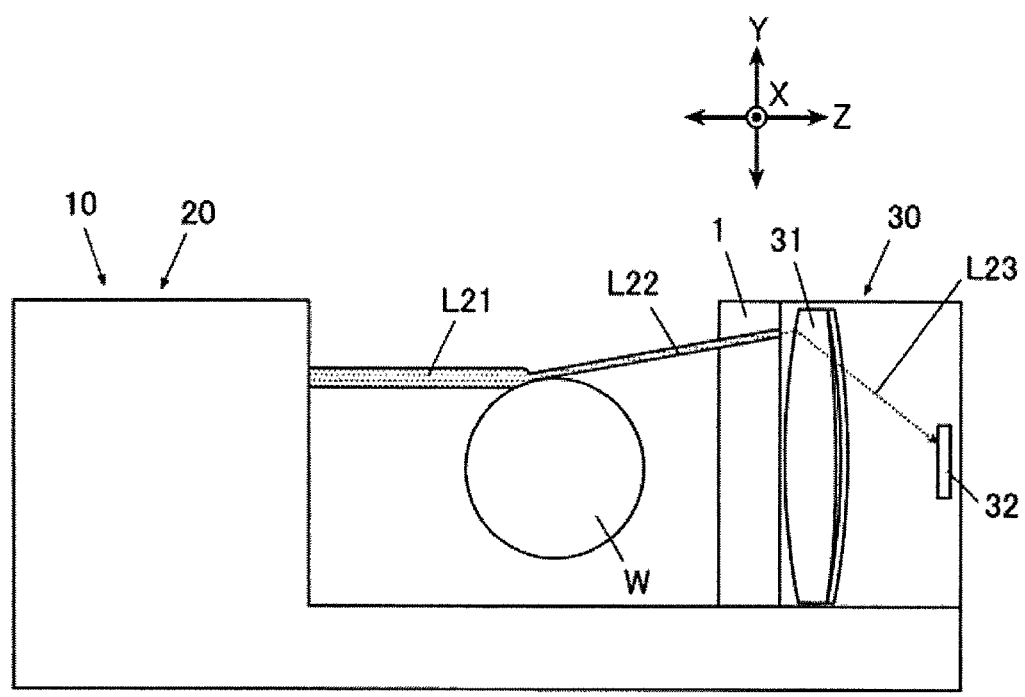
FIG. 6 is a frame view illustrating a change in a polarized state of light in an optical measuring apparatus according to modification 1.

For example, in an example shown in FIG. 6, a position of the linear polarizing plate 1 differs as compared to the embodiment. In order to simplify the description, structures similar to those in the embodiment are given the same reference numerals and a detailed description thereof is omitted. Specifically, in the example shown in FIG. 6, the linear polarizing plate 1 is placed between the work piece W and the photoreceiver 30.

Figure 7A:
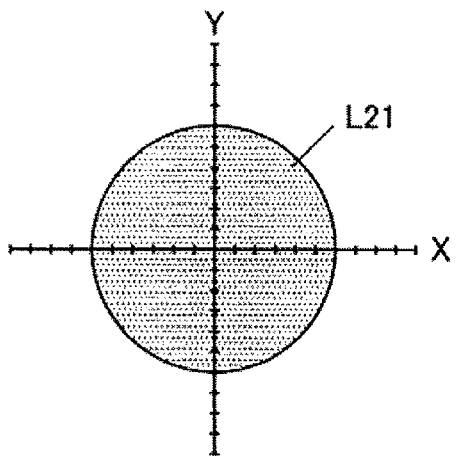
FIGS. 7A, 7B, and 7C are cross-sectional views illustrating the change in the polarized state of light shown in FIG. 6.
Figure 7B:
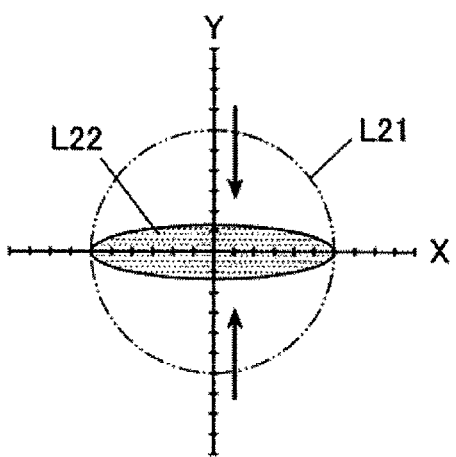
Figure 7C:
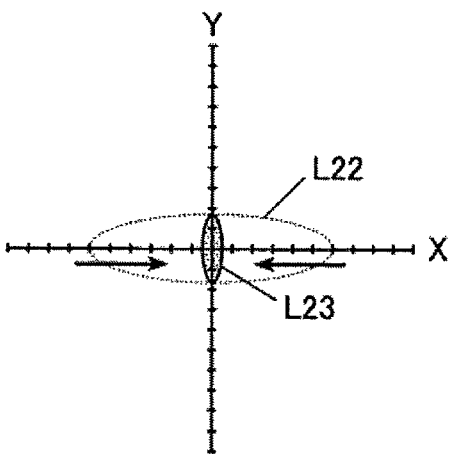
Figure 8:
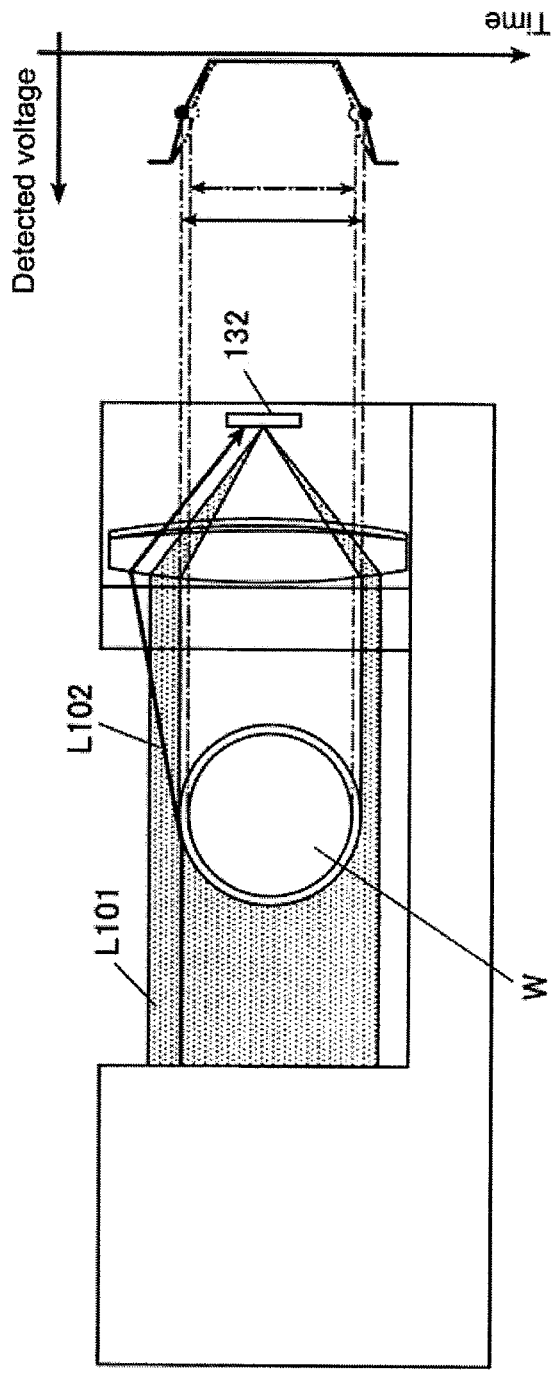
FIG. 8 is a frame view illustrating skip light generated by an optical measuring apparatus according to a conventional technology.

Next, a description is given of effects of the optical measuring apparatus 100 according to a first modification. A portion of the light L21 (see FIG. 7A) emitted from the light emitter 10 (and the scanner 20) is reflected by the surface of the work piece W to become skip light L22 (see FIG. 7B). The oscillation component of the skip light L22 reflected by the surface of the work piece W becomes attenuated during reflection off the work piece W, the oscillation component being in a perpendicular direction (Y direction in the drawings) with respect to the reflecting surface (XZ plane) of the work piece W. The skip light L22 strikes the linear polarizing plate 1 positioned between the work piece W and the photoreceiver 30. The linear polarizing plate 1 is formed such that the orientation of the polarized light is in a direction orthogonal to the emission direction of the laser beam (Z direction in the drawings) and the axis direction of the work piece W (X direction in the drawings), i.e., a perpendicular direction (Y direction in the drawings) with respect to the reflecting surface of the work piece W. Therefore, when the skip light L22 passes through the linear polarizing plate 1, the oscillation component in the horizontal direction (X direction in the drawings) with respect to the reflecting surface of the work piece W is blocked, and only the light L12 (see FIG. 7C) in the perpendicular direction (Y direction in the drawings) with respect to the reflecting surface of the work piece W passes therethrough. In other words, the light L23 that has passed through the linear polarizing plate 1 has oscillation components in both the horizontal direction (X direction in the drawings) and the perpendicular direction (Y direction in the drawings) with respect to the reflecting surface of the work piece W that become attenuated. Accordingly, an amount of incident skip light L13 received by the photoreceiver element 32 is reduced. In the above, the linear polarizing plate 1 of the optical measuring apparatus 100 according to the first modification is placed between the work piece W and the photoreceiver 30. Accordingly, the amount of incident skip light received by the photoreceiver element 32 can be reduced by the linear polarizing plate 1, and thus the dimension of the work piece W can be accurately measured.

OTHER MODIFICATIONS

For example, in the above-described embodiment and first modification, an exemplary case was described in which the linear polarizing plate 1 is positioned and fixated between the light emitter 10 (and the scanner 20) and the photoreceiver 30. However, the present invention is not limited to this. For example, a configuration is also possible in which the linear polarizing plate 1 is detachable. Specifically, in a case measuring the dimension of a work piece W having a shape that is unlikely to generate skip light, the present invention may be configured to increase the amount of incident light received by the photoreceiver element 32 and improve measurement accuracy by removing the linear polarizing plate 1.

Furthermore, in the above-described embodiment and first modification, an exemplary case was described in which one work piece W is positioned in the measurement range. However, the present invention is not limited to this. For example, two or more work pieces W can be placed in the measurement range.

Additional modifications not deviating from the scope of the present invention can also be made to detailed structures and operations of each component configuring the optical measuring apparatus 100.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. An optical measuring apparatus comprising:
a light emitter configured to emit a laser beam;
a scanner configured to convert the laser beam to a plurality of scanning laser beams, the scanner further configured to direct the plurality of scanning laser beams toward a measurement region where an object to be measured is disposed;
a linear polarizing plate configured to allow passage of only a scanning laser beam of the plurality of scanning laser beams from the scanner, the scanning laser beam being orthogonally directed to an emission direction of the laser beam and an axis direction of the object to be measured, the linear polarizing plate further configured to block passage of a scanning laser beam of the plurality of scanning laser beams that is not orthogonal to the emission direction of the scanning laser beam or not orthogonal to the axis direction of the object to be measured;
a photoreceiver configured to receive the scanning laser beam that has passed through the measurement region and the linear polarizing plate; and
a calculator configured to calculate a dimension of the measured object from a pattern of light and dark in a scanning direction, the pattern being obtained by the photoreceiver.

2. The optical measuring apparatus according to claim 1, wherein the linear polarizing plate is located between the scanner and the object to be measured.

3. The optical measuring apparatus according to claim 2, wherein the linear polarizing plate is detachable.

4. The optical measuring apparatus according to claim 1, wherein the linear polarizing plate is located between the object to be measured and the photoreceiver.

5. The optical measuring apparatus according to claim 4, wherein the linear polarizing plate is detachable.

6. The optical measuring apparatus according to claim 1, wherein the linear polarizing plate is detachable.

* * * * *